United States Patent
Ito et al.

(10) Patent No.: US 12,368,225 B2
(45) Date of Patent: Jul. 22, 2025

(54) TRANSPORT VEHICLE

(71) Applicant: JFE STEEL CORPORATION, Tokyo (JP)

(72) Inventors: Masato Ito, Sapporo (JP); Yusuke Kaneta, Sapporo (JP); Shinji Nanba, Tokyo (JP); Haruhisa Sakai, Tokyo (JP); Toshiyuki Kohara, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 165 days.

(21) Appl. No.: 18/004,179

(22) PCT Filed: Jul. 8, 2021

(86) PCT No.: PCT/JP2021/025768
§ 371 (c)(1),
(2) Date: Jan. 4, 2023

(87) PCT Pub. No.: WO2022/009949
PCT Pub. Date: Jan. 13, 2022

(65) Prior Publication Data
US 2023/0275343 A1    Aug. 31, 2023

(30) Foreign Application Priority Data
Jul. 9, 2020  (JP) .................. 2020-118172

(51) Int. Cl.
*H01Q 1/00* (2006.01)
*H01Q 1/12* (2006.01)

(52) U.S. Cl.
CPC ................. *H01Q 1/1235* (2013.01)

(58) Field of Classification Search
CPC ..................................... H01Q 1/1235
USPC ............................................. 701/49
See application file for complete search history.

(56) References Cited

U.S. PATENT DOCUMENTS

| | | |
|---|---|---|
| 11,760,293 B2 | 9/2023 | Kobayashi et al. |
| 2003/0107526 A1 | 6/2003 | Kleinschmidt |
| 2014/0361922 A1* | 12/2014 | Duncan ............. G01S 13/90 342/25 A |

FOREIGN PATENT DOCUMENTS

| | | |
|---|---|---|
| CN | 103208042 A | 7/2013 |
| CN | 109809334 A | 5/2019 |

(Continued)

OTHER PUBLICATIONS

English Translation of JP2019170228 (Year: 2019).*

(Continued)

*Primary Examiner* — Tiffany P Young
(74) *Attorney, Agent, or Firm* — KENJA IP LAW PC

(57) ABSTRACT

A transport vehicle includes at least one antenna, at least one satellite positioning receiver configured to receive positional information via the antenna, at least one antenna support member including an antenna attachment portion with the antenna attached thereto and a vehicle body connector connected to the vehicle body, and a vehicle position estimator configured to estimate a vehicle position of the transport vehicle using the positional information received by the satellite positioning receiver. The antenna support member is configured to move between at least one use state, in which the antenna is disposed at at least one use position at a predetermined distance above a loading surface of the cargo bed, and a stored state in which the antenna is disposed below the use position.

7 Claims, 6 Drawing Sheets

(56) References Cited

FOREIGN PATENT DOCUMENTS

| | | | |
|---|---|---|---|
| CN | 111278684 | A | 6/2020 |
| JP | S6061809 | A | 4/1985 |
| JP | H02249320 | A | 10/1990 |
| JP | H0653848 | A | 2/1994 |
| JP | 2978175 | B2 | 11/1999 |
| JP | 2005258754 | A | 9/2005 |
| JP | 2016065769 | A | 4/2016 |
| JP | 2019075642 | A | 5/2019 |
| JP | 2019170228 | A | 10/2019 |

OTHER PUBLICATIONS

Aug. 30, 2021, Notification of Reasons for Refusal issued by the Japan Patent Office in the corresponding Japanese Patent Application No. 2020-118172 with English language Concise Statement of Relevance.

Sep. 7, 2021, International Search Report issued in the International Patent Application No. PCT/JP2021/025768.

Dec. 4, 2023, the Extended European Search Report issued by the European Patent Office in the corresponding European Patent Application No. 21837481.7.

Nov. 15, 2024, Office Action issued by the Korean Intellectual Property Office in the corresponding Korean Patent Application No. 10-2023-7000979 with English language concise statement of relevance.

May 28, 2025, Office Action issued by the China National Intellectual Property Administration in the corresponding Chinese Patent Application No. 202180046446.6 with English language search report.

\* cited by examiner

TRANSPORT VEHICLE

TECHNICAL FIELD

The present disclosure relates to a transport vehicle provided with a vehicle body including a cargo bed.

BACKGROUND

A known example of a transport vehicle is a carrier pallet truck for transporting cargo on factory premises. For example, see Patent Literature (PTL) 1. Carrier pallet trucks travel with pallets (transported objects), on which cargo (such as steel material or coils) is loaded, on the cargo bed.

CITATION LIST

Patent Literature

PTL 1: JP 2019-75642 A

SUMMARY

Technical Problem

In recent years, research has been conducted on automatic driving technology for automobiles and the like. If automatic driving could be achieved for transport vehicles as well, work efficiency would improve. In order to achieve automatic driving, the vehicle position needs to be recognized with high accuracy. One method for recognizing the vehicle position is to specify the vehicle position using a satellite positioning system. Tall transported objects may be loaded on the cargo bed of a transport vehicle, however, and depending on the position and orientation of the vehicle, a portion of the transported object may therefore come between the antenna of the satellite positioning receiver and the satellite, causing the reception status of the antenna to deteriorate. If the reception status of the antenna deteriorates, the recognition accuracy of the vehicle position becomes unstable, which is undesirable.

An aspect of the present disclosure therefore aims to stably recognize the vehicle position by appropriately using a satellite positioning system, even for a transport vehicle.

Solution to Problem

A transport vehicle according to an aspect of the present disclosure is a transport vehicle including:
- a vehicle body including a cargo bed;
- at least one antenna configured to receive positional information from a satellite positioning system;
- at least one satellite positioning receiver configured to receive the positional information via the antenna;
- at least one antenna support member including an antenna attachment portion with the antenna attached thereto and a vehicle body connector connected to the vehicle body; and
- a vehicle position estimator configured to estimate a vehicle position of the transport vehicle using the positional information received by the satellite positioning receiver, wherein
- the antenna support member is configured to move between at least one use state, in which the antenna is disposed at at least one use position at a predetermined distance above a loading surface of the cargo bed, and a stored state in which the antenna is disposed below the use position.

Advantageous Effect

According to an aspect of the present disclosure, the vehicle position can be stably recognized by appropriately using a satellite positioning system, even for a transport vehicle.

DETAILED DESCRIPTION

Embodiments are described below with reference to the drawings.

Figure 1:
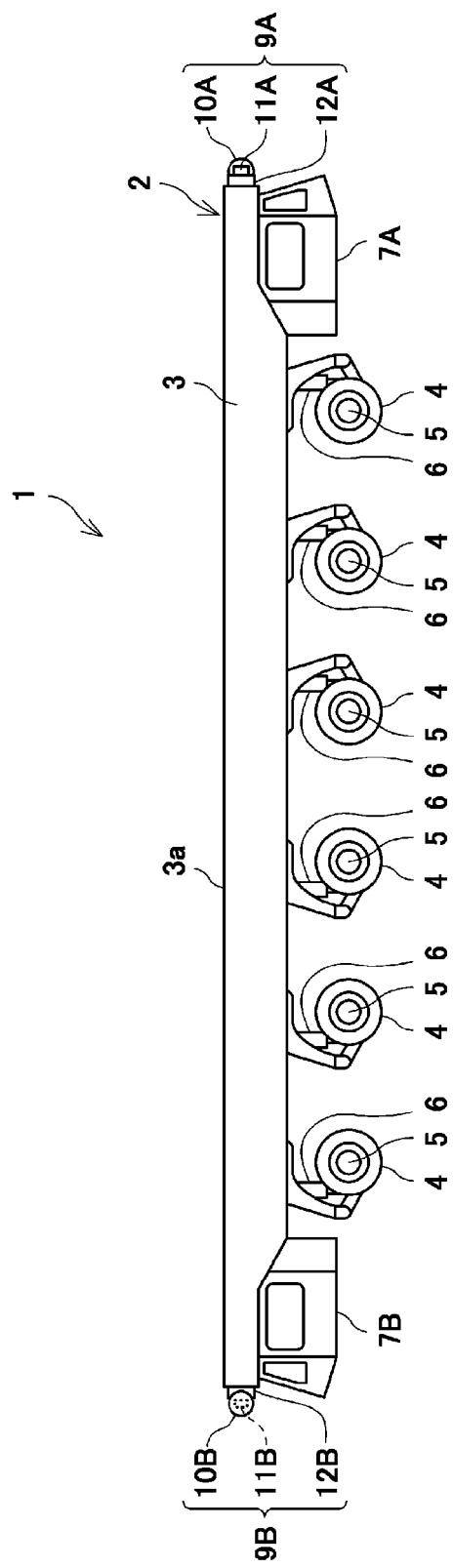
FIG. 1 is a side view of a transport vehicle.
Figure 2:
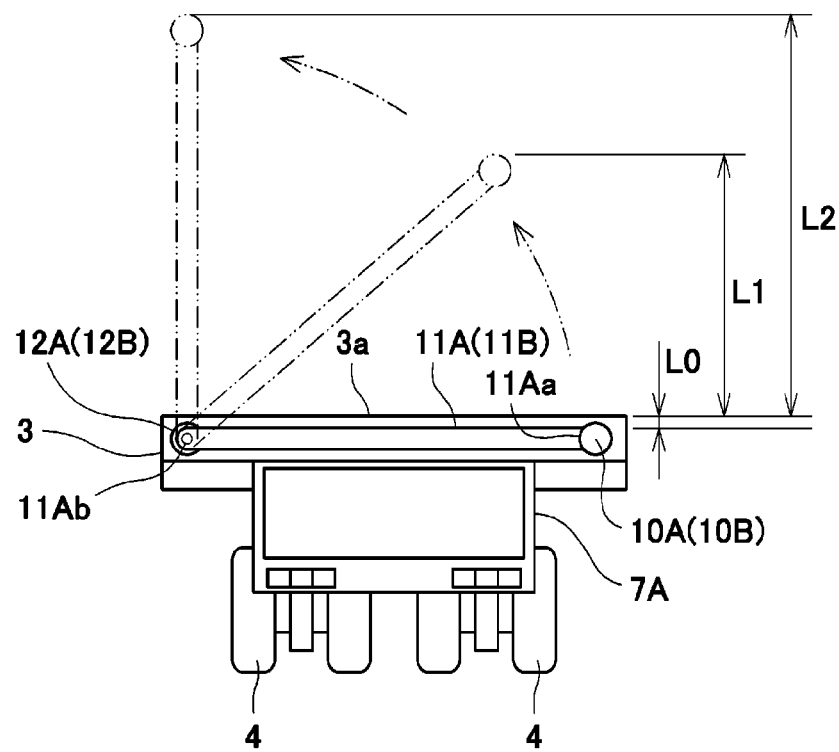
FIG. 2 is a front view of the transport vehicle of FIG. 1.

FIG. 1 is a side view of a transport vehicle 1. FIG. 2 is a front view of the transport vehicle 1 in FIG. 1. As illustrated in FIGS. 1 and 2, the transport vehicle 1 exemplified in the present embodiment is a carrier pallet truck, which is a type of heavy goods vehicle. The transport vehicle is not limited to a carrier pallet truck and may be any other type of vehicle as long as it travels with a transported object on the cargo bed. The transport vehicle 1 includes a vehicle body 2, which includes a cargo bed 3, and a plurality (for example, 24) of tires 4 that support the cargo bed 3. Each pair of tires 4 among the plurality of tires 4 is coupled by an axle 5. A pallet (transported object) loaded with cargo (such as steel material or coils) is loaded onto the cargo bed 3. Although a carrier pallet truck is illustrated as an example of the transport vehicle 1, a vehicle other than a carrier pallet truck (for example, a dump truck) may also be used. In the example in FIG. 1, the cargo bed 3 is the vehicle body 2, but the vehicle body 2 may include a frame or the like to support the cargo bed 3.

A cargo bed actuator 6 is installed between the cargo bed 3 and the axle 5. The cargo bed actuator 6 raises and lowers the cargo bed 3 between a predetermined upper position and a predetermined lower position by expansion and contraction. In the present embodiment, a hydraulic cylinder is used as the cargo bed actuator 6. The axles 5 support the load of the cargo bed 3 via the cargo bed actuators 6. A first driver's cab 7A and a second driver's cab 7B are respectively provided at the ends of the cargo bed 3 in the front-back direction. That is, when traveling in one direction, the operator boards the first driver's cab 7A, and when traveling in the other direction, the operator boards the second driver's cab 7B.

A first movable antenna set 9A is disposed at one end of the cargo bed 3 in the front-back direction. A second movable antenna set 9B is disposed at the other end of the cargo bed 3 in the front-back direction. The first movable antenna set 9A includes a first antenna 10A, a first antenna support member 11A, and a first antenna actuator 12A. The second movable antenna set 9B includes a second antenna 10B, a second antenna support member 11B, and a second antenna actuator 12B. The first movable antenna set 9A and the second movable antenna set 9B have the same structure.

The first antenna 10A and the second antenna 10B receive radio waves for positional information from a satellite positioning system (for example, RTK-GNSS or the Quasi-Zenith Satellite System). The first antenna support member 11A is connected to one end of the cargo bed 3 in the front-back direction. The second antenna support member 11B is connected to the other end of the cargo bed 3 in the front-back direction. The first antenna actuator 12A is provided at one end of the cargo bed 3 in the front-back direction and moves the first antenna support member 11A. The second antenna actuator 12B is provided at the other end of the cargo bed 3 in the front-back direction and moves the second antenna support member 11B. The first antenna actuator 12A and the second antenna actuator 12B are, for example, electric motors.

As illustrated in FIG. 2, the first antenna support member 11A is rod-shaped. The tip of the first antenna support member 11A is an antenna attachment portion 11Aa to which the first antenna 10A is attached. The base of the first antenna support member 11A is a vehicle body connector 11Ab connected to the cargo bed 3. The vehicle body connector 11Ab includes a rotation axle that has an axis extending in the front-back direction. That is, the vehicle body connector 11Ab is a rotating body that freely rotates the first antenna support member 11A about the axis with respect to the cargo bed 3. The configuration of the second antenna support member 11B is the same as that of the first antenna support member 11A, and thus a description thereof is omitted.

The first antenna support member 11A is connected to the cargo bed 3 so that it can be rotated between at least one use state and a stored state by being driven by the first antenna actuator 12A. The stored state is a state such that the first antenna 10A is positioned below a loading surface 3a (top surface) of the cargo bed 3 by a first distance L0 (L0≤zero), i.e., a state such that the entire first antenna 10A and antenna support member 11A are positioned below the loading surface 3a. In the stored state, the first antenna support member 11A is an elongated member and is arranged in the vehicle width direction along the end face of the cargo bed 3 in the front-back direction.

The at least one use state includes a first use state in which the first antenna 10A is positioned at a first use position that is above the loading surface 3a by a first distance L1 and a second use state in which the first antenna 10A is positioned at a second use position that is above the loading surface 3a by a second distance L2 (L2>L1). In the second use state, the first antenna support member 11A extends vertically, and the first antenna 10A is arranged at its maximum height. The first use state is any appropriate intermediate state between the stored state and the second use state.

Figure 3:
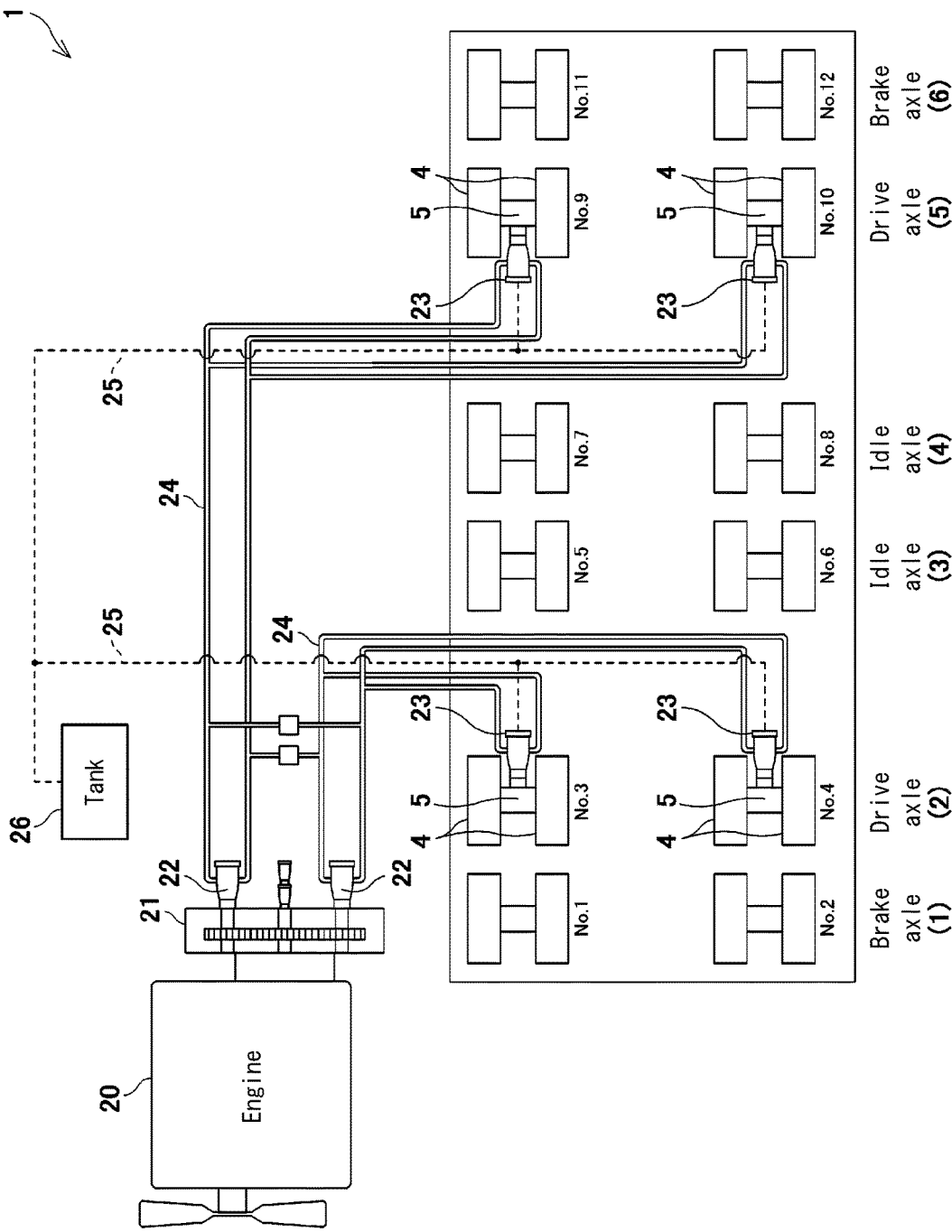
FIG. 3 is a schematic diagram of a running power system of the transport vehicle in FIG. 1.

FIG. 3 is a schematic diagram of a running power system of the transport vehicle 1 in FIG. 1. As illustrated in FIG. 3, the transport vehicle 1 has six rows of axles 5 side by side. The axles 5 in the second and fifth rows are drive axles to which drive power is transmitted. The axles 5 (drive axles) in the second and fifth rows are connected to respective hydraulic motors 23. The other axles 5 are non-drive axles (driven axles) to which drive power is not transmitted. Specifically, the axles 5 in the first row and the sixth row are brake axles to which a braking force can be applied, and the axles 5 in the third and fourth rows are idle axles to which neither a driving force nor a braking force is applied.

The transport vehicle 1 includes an engine 20 as the motor that generates the driving force. Instead of or together with the engine 20, an electric motor may also be used as the motor. The engine 20 drives a pair of hydraulic pumps 22 via a gearbox 21. The hydraulic pumps 22 are connected to the hydraulic motors 23 via hydraulic pipes 24. That is, the hydraulic pressure generated by the hydraulic pumps 22 is transmitted to the hydraulic motors 23 via the hydraulic pipes 24 for the hydraulic motors 23 to drive the axles 5 (drive axles). Drain ports of the hydraulic motors 23 are connected to a hydraulic oil tank 26 via drain pipes 25.

Figure 4:
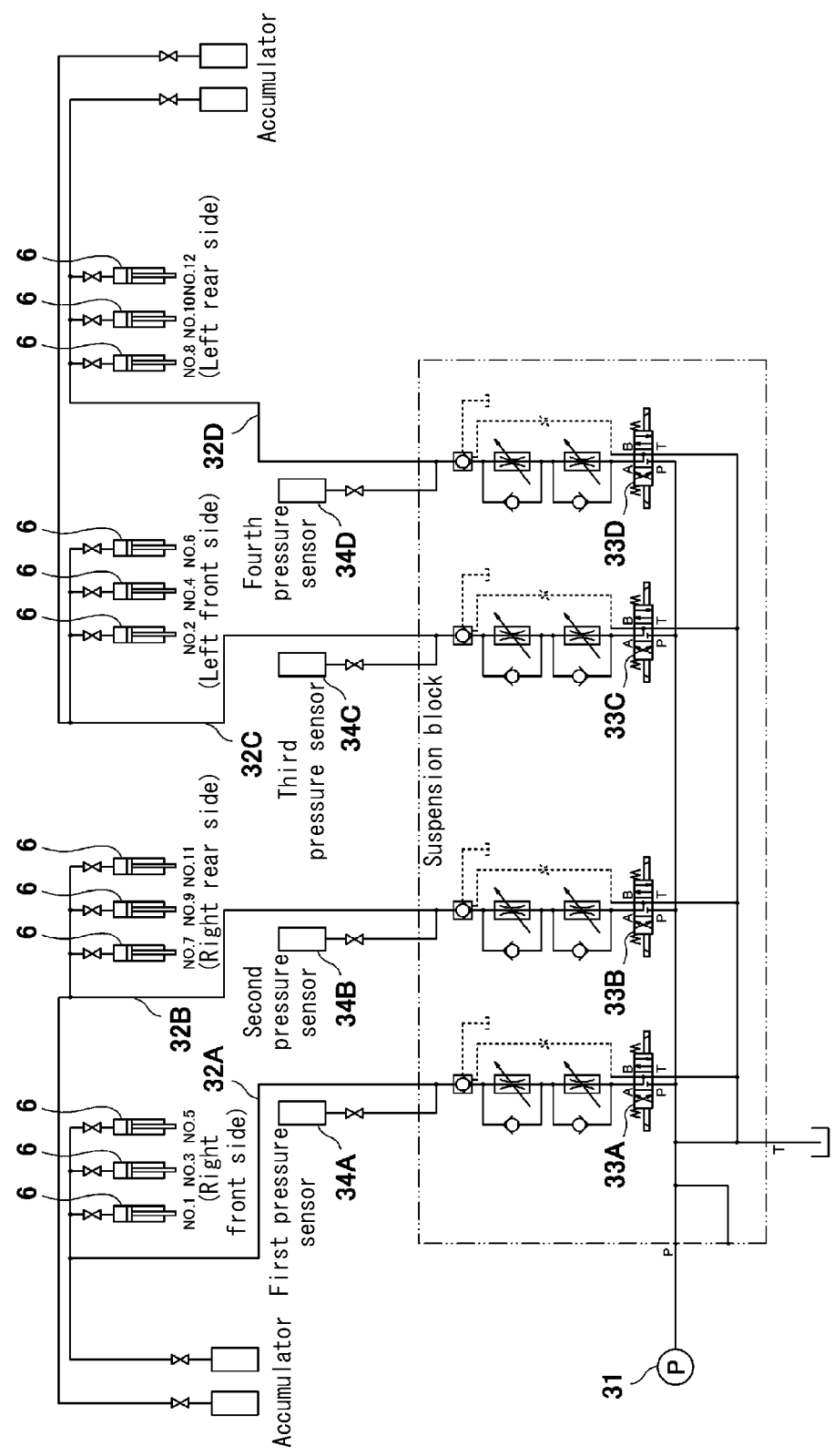
FIG. 4 is a schematic diagram of a cargo bed lifting system of the transport vehicle in FIG. 1.

FIG. 4 is a schematic diagram of a cargo bed lifting system of the transport vehicle 1 in FIG. 1. As illustrated in FIG. 4, a hydraulic pump 31 is connected via a first hydraulic pipe 32A to the cargo bed actuators 6 (No. 1, No. 3, and No. 5) corresponding to the axles 5 on one side in the vehicle width direction in the first to third rows. The hydraulic pump 31 is connected via a second hydraulic pipe 32B to the cargo bed actuators 6 (No. 7, No. 9, and No. 11) corresponding to the axles 5 on one side in the vehicle width direction in the fourth to sixth rows. The hydraulic pump 31 is connected via a third hydraulic pipe 32C to the cargo bed actuators 6 (No. 2, No. 4, and No. 6) corresponding to the axles 5 on the other side in the vehicle width direction in the first to third rows. The hydraulic pump 31 is connected via a fourth hydraulic pipe 32D to the cargo bed actuators 6 (No. 8, No. 10, and No. 12) corresponding to the axles 5 on the other side in the vehicle width direction in the fourth to sixth rows.

A first switching valve 33A is interposed in the first hydraulic pipe 32A, a second switching valve 33B is interposed in the second hydraulic pipe 32B, a third switching valve 33C is interposed in the third hydraulic pipe 32C, and a fourth switching valve 33D is interposed in the fourth hydraulic pipe 32D. The first to fourth switching valves 33A to 33D switch among a position to supply hydraulic pressure from the hydraulic pump 31 to the cargo bed actuators 6 (hydraulic cylinders) to extend the cargo bed actuators 6, a position to drain the cargo bed actuators 6 for the cargo bed actuators 6 to retract, and a position to stop the cargo bed actuators 6. In other words, by control of the first to fourth switching valves 33A to 33D, the cargo bed actuators 6 extend and retract to raise and lower the cargo bed 3.

A first pressure sensor 34A is connected to the first hydraulic pipe 32A between the cargo bed actuators 6 and the first switching valve 33A. A second pressure sensor 34B is connected to the second hydraulic pipe 32B between the cargo bed actuators 6 and the second switching valve 33B. A third pressure sensor 34C is connected to the third hydraulic pipe 32C between the cargo bed actuators 6 and the second switching valve 33C. A fourth pressure sensor 34D is connected to the fourth hydraulic pipe 32D between the cargo bed actuators 6 and the second switching valve 33D.

The first pressure sensor 34A detects the pressure at which the No. 1, No. 3, and No. 5 cargo bed actuators 6 support the cargo bed 3. The second pressure sensor 24B detects the pressure at which the No. 7, No. 9, and No. 11 cargo bed actuators 6 support the cargo bed 3. The third pressure sensor 34C detects the pressure at which the No. 2, No. 4, and No. 6 cargo bed actuators 6 support the cargo bed 3. The fourth pressure sensor 34D detects the pressure at which the No. 8, No. 10, and No. 12 cargo bed actuators 6 support the cargo bed 3. That is, the pressure detected by the first through fourth pressure sensors 34A to 34D corresponds (proportionally) to the loading weight of the cargo bed 3.

Figure 5:
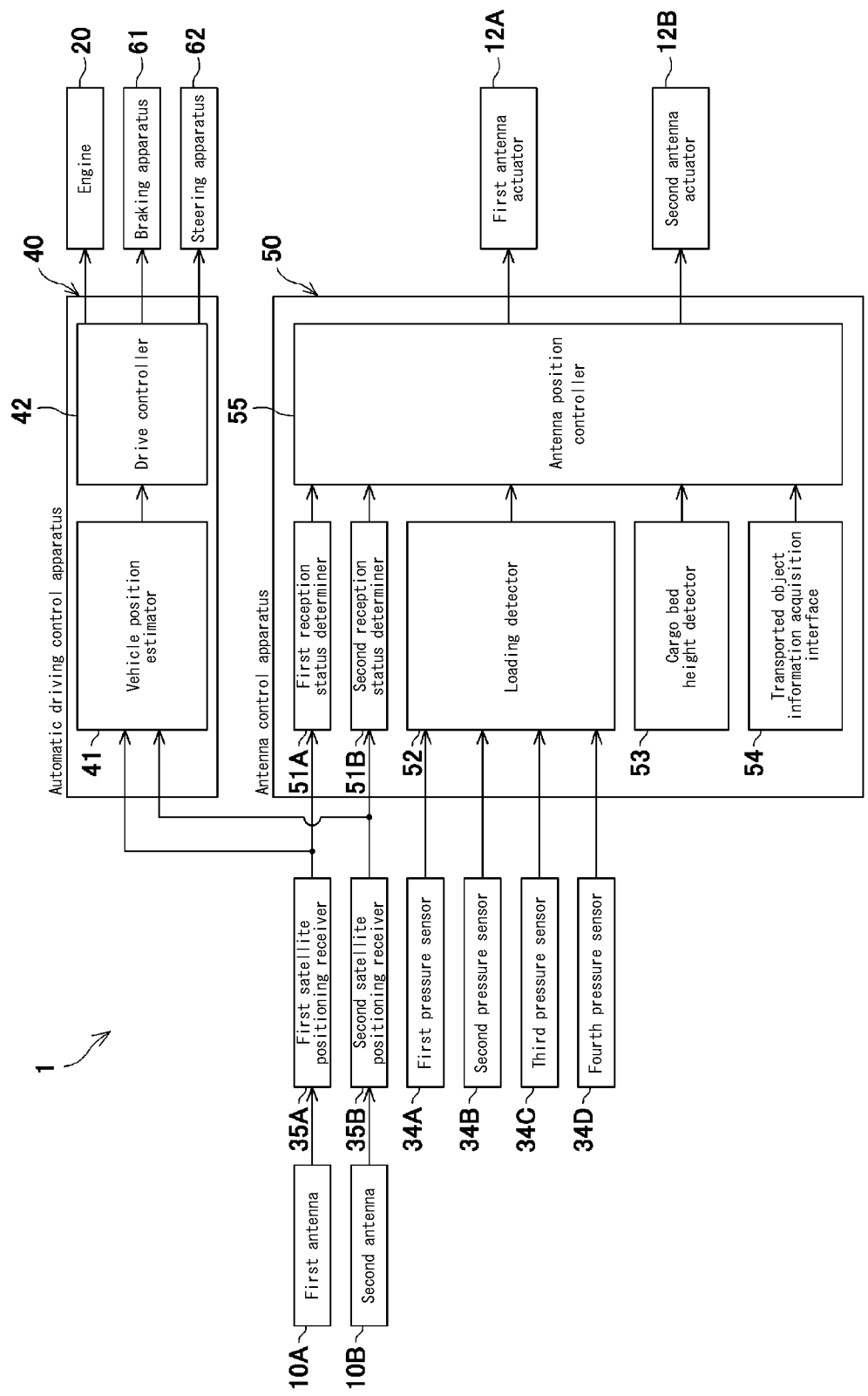
FIG. 5 is a block diagram of a control system of the transport vehicle in FIG. 1.

FIG. 5 is a block diagram of a control system of the transport vehicle 1 in FIG. 1. As illustrated in FIG. 5, the transport vehicle 1 includes an automatic driving control apparatus 40. On the hardware side, the automatic driving control apparatus 40 includes a processor, a main memory (RAM), a storage (such as a flash memory or hard disk), an I/O interface, and the like. The automatic driving control apparatus 40 controls the engine 20 and hydraulic pumps 22 to adjust the speed and acceleration/deceleration of the transport vehicle 1. The automatic driving control apparatus 40 controls a braking apparatus 61 for the transport vehicle 1 to brake. The automatic driving control apparatus 40 controls a steering apparatus 62 to adjust the steering angle (travel direction) of the transport vehicle 1.

Signals from a first satellite positioning receiver 35A and a second satellite positioning receiver 35B are inputted to the automatic driving control apparatus 40. RTK-GNSS or Quasi-Zenith Satellite System receivers, for example, are used as the first satellite positioning receiver 35A and the second satellite positioning receiver 35B. The first satellite positioning receiver 35A is connected to the first antenna 10A. The second satellite positioning receiver 35B is connected to the second antenna 10B.

The automatic driving control apparatus 40 includes an automatic position estimator 41 and a travel controller 42. The automatic position estimator 41 estimates the vehicle position of the transport vehicle 1 using the positional information received by the first and second satellite positioning receivers 35A, 35B. In a case in which the reception status of one of the first and second satellite positioning receivers 35A, 35B is good and the reception status of the other is poor, the automatic position estimator 41 estimates the vehicle position using the signal of the one with the good reception status.

In a case in which the reception status of both the first and second satellite positioning receivers 35A, 35B is good, the automatic position estimator 41 may estimate the vehicle position using the average of both signals. In a case in which the reception status of both the first and second satellite positioning receivers 35A, 35B is good, the automatic position estimator 41 may estimate the position of a specific point of the vehicle (such as the center of the vehicle) and the orientation of the vehicle based on the signals from each of the first and second satellite positioning receivers 35A, 35B. For example, even in a case in which the transport vehicle 1 makes a fan-like turn using one end in the front-back direction as the pivot point, so that the position coordinates of one end of the vehicle 1 undergo little change whereas the position coordinates of the other end of the vehicle 1 change significantly, the position of the vehicle center and the orientation of the vehicle can still be accurately ascertained. As another example, even in a case in which the transport vehicle 1 makes a spin turn with the pivot point near the center of the vehicle, so that the position coordinates of the center of the vehicle undergo little change whereas the position coordinates of the ends of the vehicle 1 change in a point-symmetrical manner, the position of the vehicle center and the orientation of the vehicle can still be accurately ascertained.

The travel controller 42 controls the engine 20, the braking apparatus 61, and the steering apparatus 62 to automatically drive the transport vehicle 1 based on the vehicle position estimated by the automatic position estimator 41, the surrounding environment, the operation plan, and the like. Upon a predetermined event (for example, detection of arrival at a predetermined position (for example, in front of a pallet)), the automatic driving control apparatus 40 is triggered to drive the cargo bed actuator 6 to raise and lower the cargo bed 3 between the aforementioned upper and lower positions. The cargo bed actuator 6 may be driven manually by an operator.

The transport vehicle 1 includes an antenna control apparatus 50. On the hardware side, the antenna control apparatus 50 includes a processor, a main memory (RAM), a storage (such as a flash memory or hard disk), an I/O interface, and the like. The antenna control apparatus 50 controls the first antenna actuator 12A and/or the second antenna actuator 12B to adjust the position of the first antenna 10A and/or the second antenna 10B. The signals of first and second satellite positioning receivers 35A, 35B and the first through fourth pressure sensors 34A to 34D are inputted to the antenna control apparatus 50.

The antenna control apparatus 50 includes a first reception status determiner 51A, a second reception status determiner 51B, a loading detector 52, a cargo bed height detector 53, a transported object information acquisition interface 54, and an antenna position controller 55. The first reception status determiner 51A determines the reception status of the first satellite positioning receiver 35A via the first antenna 10A. The second reception status determiner 51B determines the reception status of the second satellite positioning receiver 35B via the second antenna 10B.

Based on the signals of the first through fourth pressure sensors 34A to 34D, the loading detector 52 detects whether the cargo bed 3 is in a loaded state with a transported object loaded thereon or in an empty state without a transported object loaded thereon. The loading detector 52 may be any other device capable of ascertaining the weight loaded on the cargo bed 3 (for example, a load cell interposed between the cargo bed 3 and an apparatus supporting the cargo bed 3).

The cargo bed height detector 53 may detect whether the cargo bed 3 is in the upper position or the lower position based on a signal to control the cargo bed actuator 6 or may detect whether the cargo bed 3 is in the upper position or the lower position based on a signal from a sensor such as a stroke sensor of the cargo bed actuator 6 or a sensor that detects the height of the cargo bed 3 from the ground. The cargo bed height detector 53 may detect whether the cargo bed 3 is in the upper position or the lower position based on a signal indicating a cargo bed height operation by the operator.

Based on information inputted from another upper-level system, the transported object information acquisition interface 54 acquires information about the size (such as the height and length) of the transported object to be loaded on the cargo bed 3. The information may be inputted by the operator.

The antenna position controller 55 controls the first antenna actuator 12A and/or the second antenna actuator 12B based on information from the first and second reception status determiners 51A, 51B, the loading detector 52, the cargo bed height detector 53, and/or the transported object information acquisition interface 54.

Figure 6A:
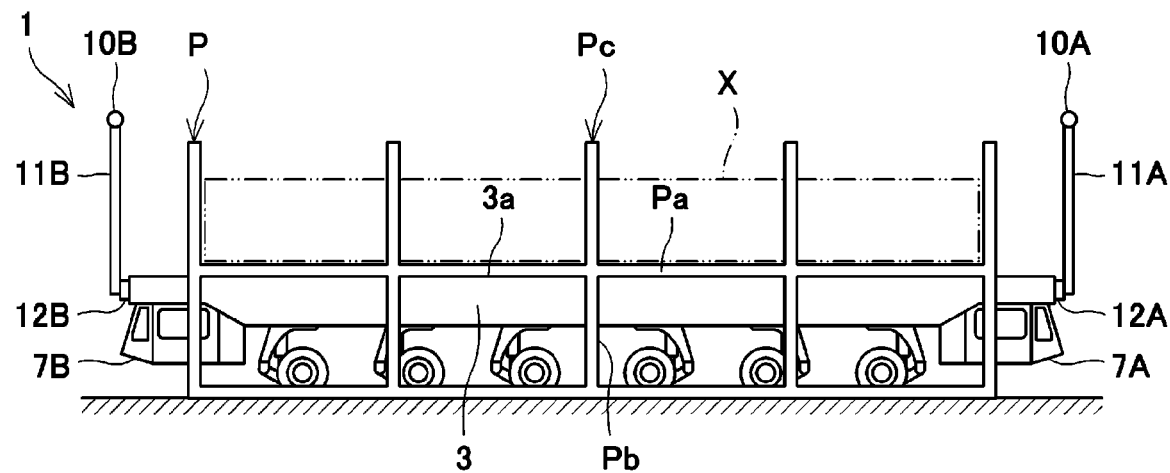
FIG. 6A is a side view of the pallet loaded state of the transport vehicle in FIG. 1.
Figure 6B:
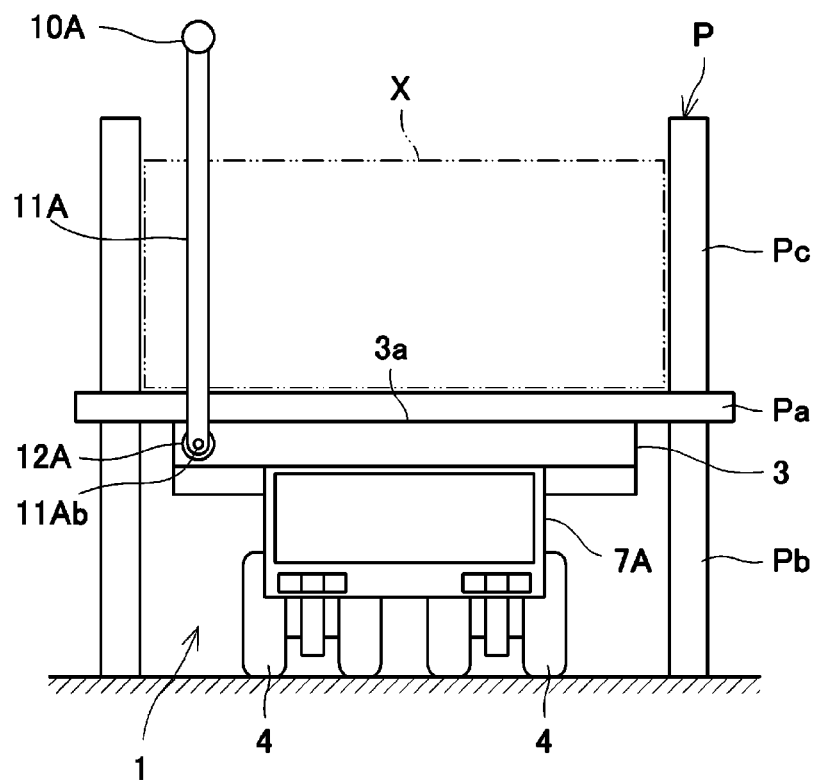
FIG. 6B is a front view of the pallet loaded state of the transport vehicle in FIG. 2.

FIG. 6A is a side view of the pallet loaded state of the transport vehicle 1 in FIG. 1. FIG. 6B is a front view of the pallet loaded state of the transport vehicle 1 in FIG. 2. As illustrated in FIGS. 6A and 6B, the transport vehicle 1 travels with a pallet P, on which cargo X (such as steel material or coils) is loaded, on the cargo bed. The pallet P has a bottom Pa on which the cargo X is placed, legs Pb that protrude downward from the side ends of the bottom Pa and contact the ground, and side portions Pc that protrude upward from the side ends of the bottom Pa and against which the cargo X is placed laterally. The empty transport vehicle 1 enters the space under the legs Pb of the pallet P with the cargo bed 3 lowered to the aforementioned lower position. From that state, the cargo bed 3 is raised to the aforementioned upper position, and the cargo bed 3 lifts the pallet P, thereby placing the transport vehicle 1 in the loaded state.

In the transport vehicle 1 in the loaded state, the upper edge of the pallet P and the cargo X is higher than the loading surface 3a of the cargo bed 3. Therefore, when the first antenna support member 11A and the second antenna support member 11B are in the aforementioned stowed state, the pallet P and/or the cargo X might interfere with the reception of the first antenna 10A and the second antenna 10B.

Therefore, as illustrated in the example below, the antenna position controller 55 (see FIG. 5) controls the first antenna actuator 12A and/or the second antenna actuator 12B to avoid interference by the pallet P and/or the cargo X with the reception of the first antenna 10A and the second antenna 10B.

As illustrated in FIGS. 5 and 6, in the case of using the first antenna 10A, the antenna position controller 55 can control the first antenna actuator 12A so that the first antenna 10A moves higher when the first reception status determiner 51A determines that the reception status of the first satellite positioning receiver 35A via the first antenna 10A is poor. Then, when the first reception status determiner 51A determines that the reception status of the first satellite positioning receiver 35A via the first antenna 10A is good, the antenna position controller 55 can control the first antenna actuator 12A so that the first antenna 10A stops.

Similarly, in the case of using the second antenna 10B, the antenna position controller 55 can control the second antenna actuator 12B so that the second antenna 10B moves higher when the second reception status determiner 51B determines that the reception status of the second satellite positioning receiver 35B via the second antenna 10B is poor. Then, when the second reception status determiner 51B determines that the reception status of the second satellite positioning receiver 35B via the second antenna 10B is good, the antenna position controller 55 can control the second antenna actuator 12B so that the second antenna 10B stops.

In this way, even if the reception status of the first and/or second antennas 10A, 10B is poor, the first and/or second antenna support members 11A, 11B move so that the reception status of the first and/or second antennas 10A, 10B becomes good. The reception status of the first and/or second antennas 10A, 10B can therefore be automatically maintained in a good status.

When the loading detector 52 detects that the cargo bed 3 is in the loaded state, the antenna position controller 55 can control the first antenna actuator 12A and/or the second antenna actuator 12B so the first antenna support member 11A and/or the second antenna support member 11B are in the aforementioned first use state or second use state. Then, when the loading detector 52 detects that the cargo bed 3 is in the empty state, the antenna position controller 55 can control the aforementioned antenna actuators so that the first antenna support member 11A and the second antenna support member 11B are in the aforementioned stored state. This configuration enables the first and/or second antenna support members 11A, 11B to be moved automatically to the appropriate state according to whether a transported object is on the cargo bed 3.

When the cargo bed height detector 53 detects that the cargo bed 3 is at the aforementioned upper position, the antenna position controller 55 can control the first antenna actuator 12A and/or the second antenna actuator 12B so the first antenna support member 11A and/or the second antenna support member 11B are in the aforementioned first use state and/or second use state. Then, when the cargo bed height detector 53 detects that the cargo bed 3 is in the aforementioned lower position, the antenna position controller 55 can control the first antenna actuator 12A and/or the second antenna actuator 12B so that the first antenna support member 11A and/or the second antenna support member 11B move to the aforementioned stored state.

This configuration enables the first and/or second antenna support members 11A, 11B to be moved automatically to the appropriate state according to whether a transported object is on the cargo bed 3. That is, before a pallet P loaded with cargo X is placed on the cargo bed 3, the cargo bed 3 is lowered so that the cargo bed 3 can enter under the pallet P. After the pallet P loaded with cargo X is placed on the cargo bed 3, the cargo bed 3 is then raised. Hence, by adjustment of the height of the first and/or second antennas 10A, 10B according to the height of the cargo bed 3, the first and/or second antennas 10A, 10B can be moved automatically to an appropriate position according to whether a transported object is on the cargo bed 3.

The antenna position controller 55 may control the first antenna actuator 12A and/or the second antenna actuator 12B so as to change the position of the first antenna 10A and/or the second antenna 10B according to information, acquired by the transported object information acquisition interface 54, on the size (for example, height and length) of the transported object. As a result of the first and/or second antenna support members 11A, 11B being moved within the range of the aforementioned use states according to the information on the size of the transported object (for example, the height of the transported object) loaded on the cargo bed 3, the first and/or second antennas 10A, 10B can be moved automatically to a position at which the transported object loaded on the cargo bed 3 does not interfere with reception.

According to the configuration described above, the first and second antennas 10A, 10B are positioned at a predetermined distance above the loading surface 3a of the cargo bed 3 by the first and second antenna support members 11A, 11B being moved to the aforementioned use state. Interference with the reception of the first antenna 10A and the second antenna 10B by the pallet P and the cargo X loaded on the cargo bed 3 can therefore be avoided. Moreover, by the first or second antenna support members 11A, 11B being moved to the aforementioned stored state, the first or second antennas 10A, 10B are prevented from becoming an obstacle during the operation to load the pallet P on the cargo bed 3. Accordingly, the vehicle position can be stably recognized by appropriately using a satellite positioning system, even for the transport vehicle 1.

When the first and second antenna support members 11A, 11B are in the stored state, the first and second antenna support members 11A, 11B and first and second antennas 10A, 10B are entirely located below the loading surface 3a of the cargo bed 3. Therefore, when the pallet P placed on the ground has the cargo X loaded thereon, and the transport vehicle 1 is driven so that the cargo bed 3 slides under the pallet P to load the pallet P on the cargo bed 3, the first or second antenna support member 11A, 11B and the first or second antenna 10A, 10B can be prevented from interfering with the pallet P.

The antenna position controller 55 can prevent interference with the pallet P by placing whichever of the first and second antenna support members 11A, 11B is located in the forward travel direction in the aforementioned stored state. The antenna control apparatus 50 can determine that the driver's seat at whichever of the first driver's cab 7A and the second driver's cab 7B is powered ON is the forward travel direction. The antenna position controller 55 may also determine that the pallet P on the ground is drawing closer based on images from cameras that capture images in the front-back directions and place whichever of the first and second antenna support members 11A, 11B is closer to the pallet P in the stored state.

As the configuration for causing the antenna support members to move between the use position and the stored position, the antenna support member may be configured to extend and retract, or to be foldable, instead of being configured to rotate. The antenna support member may be manually operated instead of being operated by an actuator.

REFERENCE SIGNS LIST

1 Transport vehicle
3 Cargo bed
3a Loading surface
6 Cargo bed actuator
10A First antenna
10B Second antenna
11Aa Antenna attachment portion
11Ab Vehicle body connector
11A First antenna support member
11B Second antenna support member
12A First antenna actuator
12B Second antenna actuator
35A First satellite positioning receiver
35B Second satellite positioning receiver
40 Automatic driving control apparatus
41 Automatic position estimator
42 Travel controller
50 Antenna control apparatus
51A First reception status determiner
51B Second reception status determiner
52 Loading detector
53 Cargo bed height detector
54 Transported object information acquisition interface
55 Antenna position controller

The invention claimed is:

1. A transport vehicle comprising:
a vehicle body comprising a cargo bed;
at least one antenna configured to receive positional information from a satellite positioning system;
at least one satellite positioning receiver configured to receive the positional information via the antenna;
at least one antenna support member being a physical member comprising an antenna attachment portion with the antenna attached thereto and a vehicle body connector connected to the vehicle body;
an automatic driving control apparatus comprising a processor including a vehicle position estimator configured to estimate a vehicle position of the transport vehicle using the positional information received by the satellite positioning receiver;
an antenna actuator configured to cause the antenna support member to move; and
an antenna position controller configured to control the antenna actuator, wherein
the antenna position controller is configured to
control the antenna actuator so that the antenna moves to at least one use state, in which the antenna is disposed at at least one use position at a predetermined distance above a loading surface of the cargo bed when a transported object is loaded on the cargo bed, and
control the antenna actuator so that the antenna moves to a stored state in which the antenna is disposed below the use position when a transported object is not loaded on the cargo bed.

2. The transport vehicle according to claim 1, wherein the antenna support member is configured so that when the antenna support member is in the stored state, the antenna support member and the antenna are entirely positioned below the loading surface of the cargo bed.

3. The transport vehicle according to claim 1, further comprising:
an antenna control apparatus comprising a processor including a loading detector configured to detect whether the cargo bed is in a loaded state with a transported object loaded thereon or an empty state without a transported object loaded thereon, wherein
the antenna position controller is configured to
control the antenna actuator so that the antenna support member moves to the use state when the loading detector detects that the cargo bed is in the loaded state, and
control the antenna actuator so that the antenna support member moves to the stored state when the loading detector detects that the cargo bed is in the empty state.

4. The transport vehicle according to claim 1, wherein the processor of the antenna control apparatus further comprises:
a transported object information acquirer configured to acquire information on a transported object to be loaded on the cargo bed,
the at least one use position comprises a first use position in which the antenna is a first distance from the loading surface and a second use position in which the antenna is a second distance from the loading surface, the second distance being different from the first distance,
the at least one use state comprises a first use state in which the antenna is disposed at the first use position and a second use state in which the antenna is disposed at the second use position, and
the antenna position controller is configured to control the antenna actuator to change a position of the antenna according to the information acquired by the transported object information acquirer.

5. The transport vehicle according to claim 1, wherein
the at least one antenna support member includes a first antenna support member connected to one end of the vehicle body and a second antenna support member connected to another end of the vehicle body,
the at least one antenna includes a first antenna attached to the first antenna support member and a second antenna attached to the second antenna support member,
the at least one satellite positioning receiver includes a first satellite positioning receiver connected to the first antenna and a second satellite positioning receiver connected to the second antenna, and the vehicle position estimator is configured to estimate the vehicle position using the corresponding positional information received by the first satellite positioning receiver and the second satellite positioning receiver respectively via the first antenna and the second antenna.

6. The transport vehicle according to claim 1, further comprising:
a reception status determiner configured to determine a reception status of the antenna,
wherein the antenna position controller is configured to:
control the antenna actuator so that the antenna moves when the reception status determined by the reception status determiner is poor; and
control the antenna actuator so that the antenna support member stops when the reception status determined by the reception status determiner is good.

7. A transport vehicle comprising:
a vehicle body comprising a cargo bed;
at least one antenna configured to receive positional information from a satellite positioning system;
at least one satellite positioning receiver configured to receive the positional information via the antenna;
at least one antenna support member being a physical member comprising an antenna attachment portion with the antenna attached thereto and a vehicle body connector connected to the vehicle body;
an automatic driving control apparatus comprising a processor including a vehicle position estimator configured to estimate a vehicle position of the transport vehicle using the positional information received by the satellite positioning receiver;
an antenna actuator configured to cause the antenna support member to move;
an antenna position controller configured to control the antenna actuator;
a cargo bed actuator configured to raise and lower the cargo bed between a predetermined upper position and a predetermined lower position; and
an antenna control apparatus comprising a processor including a cargo bed height detector configured to detect whether the cargo bed is in the upper position or the lower position,
wherein
the antenna position controller is configured to
control the antenna actuator so that the antenna support member moves to the use state when the cargo bed height detector detects that the cargo bed is in the upper position, and
control the antenna actuator so that the antenna support member moves to the stored state when the cargo bed height detector detects that the cargo bed is in the lower position.

* * * * *